United States Patent [19]
Saitou et al.

[11] Patent Number: 5,421,516
[45] Date of Patent: Jun. 6, 1995

[54] METHOD AND APPARATUS FOR COATING A SOLUTION CONTAINING BRAZING ALLOY POWDERS AND COATING HEAD FOR THE CURTAIN COATER

[75] Inventors: Hitoshi Saitou, Numazu; Hiroto Momosaki, Susono; Ken Touma, Mishima; Nobuo Hosokawa, Tomobemachi, all of Japan

[73] Assignee: Mitsubishi Alminum Kabushiki Kaisha, Tokyo, Japan

[21] Appl. No.: 98,823

[22] Filed: Jul. 29, 1993

[30] Foreign Application Priority Data

Aug. 4, 1992 [JP] Japan ................... 4-227899
Sep. 4, 1992 [JP] Japan ................... 4-262916

[51] Int. Cl.6 .................................. C23C 26/00
[52] U.S. Cl. ..................... 239/121; 239/379; 239/455; 239/597; 222/109; 118/DIG. 4
[58] Field of Search ............... 239/124, 120, 121, 193, 239/455, 597, 20, 379; 222/109; 118/DIG. 4

[56] References Cited
U.S. PATENT DOCUMENTS

| | | | |
|---|---|---|---|
| 3,193,149 | 7/1965 | Beaubien | 222/109 |
| 3,341,354 | 9/1967 | Woods et al. | 239/597 |
| 3,360,202 | 12/1967 | Taylor et al. | 239/455 |
| 4,249,478 | 2/1981 | Gruener | 118/DIG. 4 |
| 4,557,217 | 12/1985 | Zingg | 118/DIG. 4 |
| 4,676,190 | 6/1987 | Spengler | 118/DIG. 4 |
| 4,747,538 | 5/1988 | Dunn et al. | 239/124 |

FOREIGN PATENT DOCUMENTS

2070461 9/1981 United Kingdom ............... 239/594

Primary Examiner—Karen B. Merritt
Attorney, Agent, or Firm—Wenderoth, Lind & Ponack

[57] ABSTRACT

A coating head is provided along a conveyor path, and directs a coating solution toward the objects traveling on the conveyor path below the coating head. The coating head feeds the coating solution in such a manner that it forms a curtain-like stream when it flows onto the objects. A collector receptacle is provided below the coating head for accepting the remainder of the coating solution therein, and a circulating conduit path connects between the collector receptacle and the coating head by way of an intervening circulating pump, for re-using the remainder of the coating solution. The coating solution comprises a brazing alloy powder solution. The coating head includes a storage container, a level setting arrangement provided on one lateral side of the storage container for controlling the level of the coating solution within the storage container, and a delivery section including an outlet slit located below the storage container and communicating with the bottom thereof for producing a curtain-like stream of the solution.

20 Claims, 7 Drawing Sheets

METHOD AND APPARATUS FOR COATING A SOLUTION CONTAINING BRAZING ALLOY POWDERS AND COATING HEAD FOR THE CURTAIN COATER

BACKGROUND OF THE INVENTION

1. Field of the Invention

The present invention relates generally to the brazing process, and more particularly to a method and apparatus for applying a coating of a solution that contains brazing alloy powders upon joints between different parts to be joined. The present invention may be used for a heat exchanger that includes an extruded metal tube and a corrugated fin which are joined together, and may also be applied to the manufacture of such heat exchanger. Furthermore, a coating head of a curtain coater apparatus comprises part of the present invention.

2. Description of the Prior Art

Typically, a conventional heat exchanger includes an extruded metal tube or pipe and a corrugated fin, which are joined together at the points where they engage each other, by means of a brazing process. In the conventional heat exchanger, the corrugated fin is formed from a brazing sheet that is clad with a sheet shaped brazing alloy and an aluminum sheet, and the respective portions of the tube and fin which engage each other are joined together by the brazing alloy component contained in the brazing sheet.

Recently, a brazing alloy powder solution was developed which contains a mixture composed of metal powders such as powdery aluminum (such as Al—Si alloy powders specifically used for the brazing process) and a binder, the mixture being obtained by mixing them together in a particular solvent. When this brazing alloy powder solution is used, it may be possible to obtain the corrugated fin simply by forming an aluminum sheet alone, without using the brazing sheet. Despite this usefulness, there is practically no effective means for placing the brazing alloy powders into the joints where the extruded metal tube and corrugated fin engage each other.

Tools that may be used for coating the brazing alloy powder solution upon the parts to be joined include brushing, rolling, spraying, and the like. These tools are not useful when a uniform coating thickness and reliable or stable coating during the successive coating process are critical factors.

For this purpose, it may be possible to use what is called a curtain coating process in the relevant field, whereby the coating solution containing the brazing alloy powders is allowed to flow like a curtain stream across, and each individual object being processed, such as an extruded metal tube, travels successively on the conveyor passage through the curtain stream. If the brazing alloy powders such as aluminum powders have a large particle size and specific gravity, they will tend to precipitate and settle down as the coating process progresses. As a result, uniformity of the composition of the coating solution cannot be maintained. This conventional curtain coating process is not suitable when a uniform coating thickness must be formed successively on all the objects being processed.

SUMMARY OF THE INVENTION

In view of the problems described above in connection with the prior art, it is one object of the present invention to provide a method and apparatus that allow a uniform coating of a coating solution containing brazing alloy powders to be applied successively onto objects being processed, such as extruded aluminum tubes.

Another object of the present invention is to provide a method and apparatus which employ the curtain coating process, wherein the apparatus includes a coating head that implements the curtain coating process.

In one aspect, the method according to the present invention includes allowing the coating solution to flow like a curtain stream, moving objects on the conveyor across the curtain stream formed by the flowing coating solution, and applying the coating onto the objects, wherein the coating solution contains brazing alloy powders and wherein the method further includes collecting the remainder of the coating solution in a collector receptacle below the objects being processed, and recycling the remainder of the coating solution collected in the receptacle by feeding it back into its storage container.

The coating solution may be composed of any suitable brazing alloy powders and any suitable binder which may be conditioned by adding any suitable solvent, or solvent and flux.

The brazing alloy powders that may be contained in the coating solution include any one selected from the group consisting of Al—Si, Al—Si—Mg, Al—Zn, Al—Zn—Si powders each having a particle size between 10 $\mu$m and 100 $\mu$m.

The binders that may be added to the brazing alloy powders include any one selected from the acrylic resins or methacrylic resins that have the molecular weight of between 1000 and 100000 and which should preferably have a higher volatility rather than being decomposed into carbons when exposed to the brazing temperature.

The solvents that may be added to any selected binder include any one selected from the aliphatic alcohols having a number of carbons between 1 and 8, such as methanol, ethanol, propanol, butanol, isopropyl alcohol, and pentanol.

The fluxes that may be added include any one selected from the fluorides such as $KF-AlF_3$ and $RbF-AlF_3$, or any one selected from the chlorides such as $KCl-LiCl-NaF$, $CaCl_2-KCl-ZnCl_2$, $NaCl-KCl-LiCl-LiF-ZnCl_2$ and $ZnCl_2-NaF-NH_4Cl$.

As an example, the coating solution may contain a mixture composed of 100 parts of aluminum alloy powders, 0.1 to 25 parts of binder having a high volatility rather than being decomposed into carbons when exposed to the brazing temperature, and 10 to 200 parts of alcohol as solvent.

Figure 1:
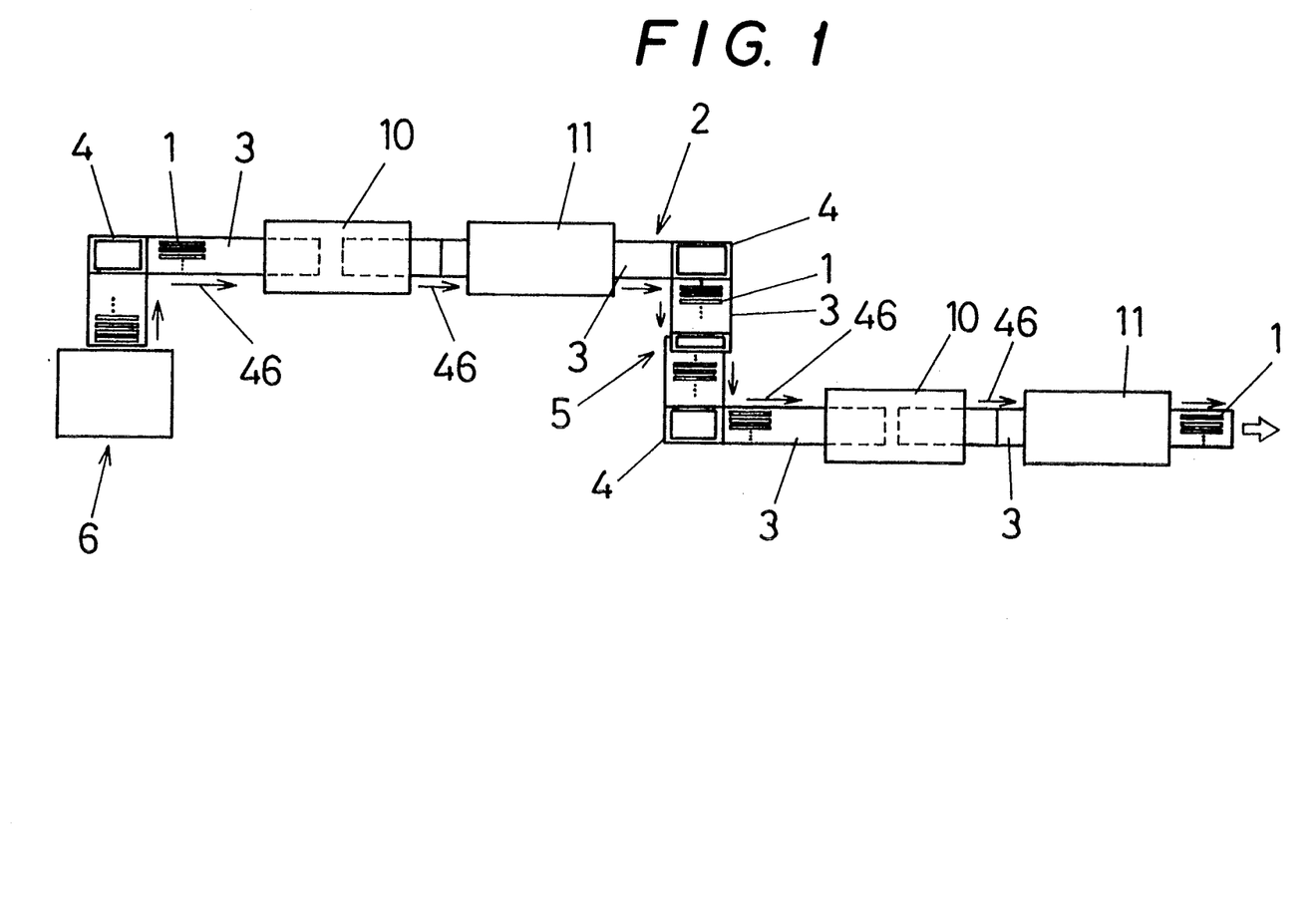
FIG. 1 is a plan view illustrating an apparatus for coating a brazing alloy powder solution according to a preferred embodiment of the present invention.

The curtain stream formed by the coating solution when it is flowing may have a width larger than the width of the objects across the conveyor path on which the objects being processed travel as shown in FIG. 1, so that it can cover the entire area of each individual object on one side thereof. Alternatively, when the objects travel on the conveyor path with their longitudinal edges across the conveyor path, the curtain stream may have a width smaller than the width across the conveyor path, and the coating process can take place with the opposite ends of the respective objects remaining not coated.

The apparatus according to the present invention includes a coating head located along a conveyor path and which produces a curtain stream when the coating solution is allowed to flow down onto the objects, wherein it further includes a collector receptacle which accepts therein the remainder of the coating solution below the coating head, and a recycling conduit path connecting between the collector receptacle and the coating head by means of an intermediate circulating pump.

A drier section may be located downstream the coating head along the conveyor path. Furthermore, a reverser section may be provided midway along the conveyor path for allowing objects to be turned over. A coating head and drier section pair, including the associated collector receptacle and recycling conduit path, may be provided on each of the upstream and downstream sides of the reverser section.

It is possible that the brazing alloy powder components contained in the coating solution may precipitate and settle down on the bottom of the collector receptacle. According to the method and apparatus of the present invention, the coating solution is forced to be recycled from the collector receptacle back to the coating head, and travels through the recycling conduit path back to the coating head under a stirring action. Thus, the coating solution can maintain its constant composition, and can be used over again for succeeding objects traveling on the conveyor path.

In one aspect, the coating head in accordance with the present invention includes a storage container open at the top for containing the coating solution, means for setting the level of the coating solution in the storage container which is located adjacent to the storage container on one lateral side thereof, and an outlet slit on the bottom of the storage container through which the coating solution is allowed to flow to form a curtain-like stream against the objects being processed.

The level setting means may be provided in the form of an overflow edge formed on one lateral side member of the storage container, or in the form of several exit ports at different levels on the lateral side of the storage container. A removable plug may be mounted to each of the exit ports. In either form, an overflow receptacle may be provided for accepting any overflow from the level setting means, and may be connected to the recycling conduit path.

The outlet slit should preferably have a certain length in the direction in which the coating solution is flowing through it. In this way, in the event that the outlet slit becomes clogged with some metal powders, the portion of the coating solution that surrounds those metal powders can flow around them, and then down through the outlet. To avoid any break in the falling curtain stream, the outlet slit should preferably have a specific length at least double the slit gap formed between the coating head members.

In accordance with the coating head described above, the coating solution in the storage container may be delivered under pressure through the outlet slit on the bottom of the storage container, flowing like a curtain stream across which objects being processed travel on the conveyor path, thereby allowing a uniform coating to be applied successively onto the objects.

The coating solution in the storage container may be maintained at a constant level by means of the level setting means, which places the outlet slit under a constant pressure under which the coating solution can be delivered through the outlet slit at a constant rate. Thus, the outlet slit may be prevented from being clogged with the metal powder particles in the coating solution by placing the outlet slit under the constant pressure. In the event that the outlet slit, becomes clogged with the metal powder particles, they can be removed by the pressure.

The coating solution in the storage container contains some metal powders having a specific particle size and specific gravity which may cause them to tend to precipitate and settle down on the bottom. As the coating solution in the storage container may be delivered successively through the outlet slit under pressure and at the constant rate, the metal powder particles will not stay in the container, and the coating solution can maintain its constant composition with which it can be delivered for the coating.

BRIEF DESCRIPTION OF THE DRAWINGS

These and other objects, features, and advantages of the present invention may readily be understood from the following detailed description of several preferred embodiments of the present invention by referring to the accompanying drawings, in which:

FIG. 5b is a side view illustrating the coating head shown in FIG. 5a;

DETAILS OF THE PREFERRED EMBODIMENTS

Referring now to FIG. 1, the construction of the apparatus according to the preferred embodiment of the present invention is shown, and may be used in an application where a coating solution that contains a brazing alloy such as aluminum alloy in powdery form may be coated onto an extruded metal tube 1 made of aluminum alloy in a heat exchanger, for example. As shown in FIG. 1, the apparatus includes a conveyor arrangement, generally designated by reference numeral 2, that carries an object being processed, such as an extruded metal tube 1. The conveyor arrangement, includes conveyors 3, direction changers 4, and a reverser section 5 which is located midway along the conveying path.

Figure 2:
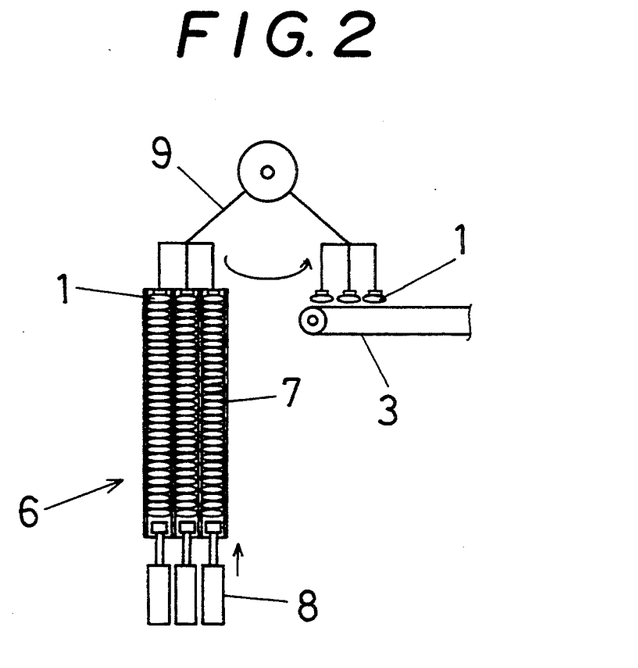
FIG. 2 is a schematic diagram illustrating an inlet section in the preferred embodiment shown in FIG. 1.

On an inlet side of the conveyor arrangement 2, there is an inlet section 6 which includes an aligner 7, pushing-up cylinders 8 and an arm 9, as shown in FIG. 2. The arm 9 is capable of holding and moving several objects 1 at one time onto the conveyor path 3 for each operation. Specifically, the arm 9 includes a number of vacuum chucks corresponding to the dumber of objects 1 being processed, each of the vacuum chucks being actuated for holding the corresponding object under suction and transferring it onto the corresponding conveyor path 3.

The conveyor arrangement 2 further includes a curtain coater 10 and a drier 11 on an upstream side of the reverser section 5, and another curtain coater 10 and drier 11, of identical construction to those on the upstream side, located on the downstream side of the reverser section 5.

Figure 3:
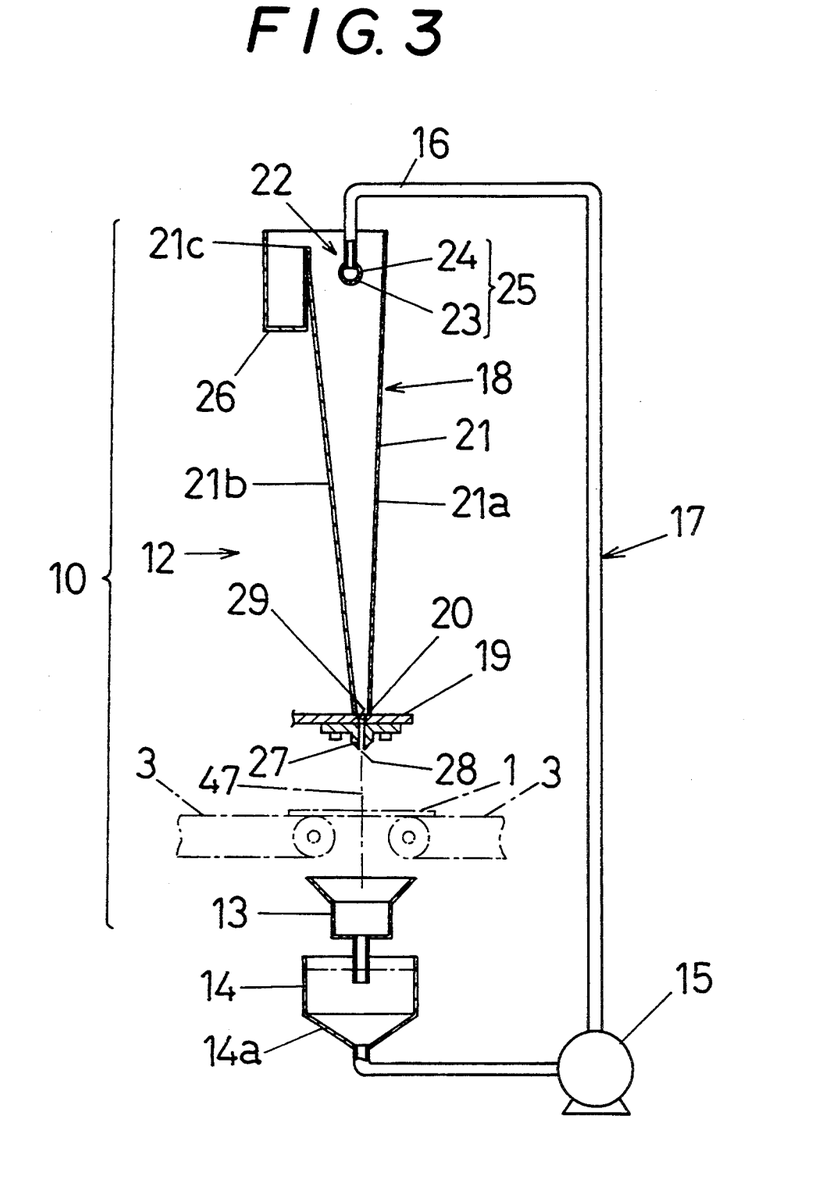
FIG. 3 is a cross-sectional view illustrating a coating arrangement in the preferred embodiment shown in FIG. 1.

The curtain coater 10 provides a brazing alloy powder solution (which will be referred to as a "coating solution") which is allowed to fall down in a curtain-like fashion, across which the objects being processed, which in this case is the extruded metal tubes 1 which will be simply referred to as "the objects being processed", travel on the conveyor path 3. As shown in FIG. 3, there is a coating head 12 above the conveyor path 3, a trough 13 below the conveyor path 3 for receiving the remainder of the coating solution, and a collector tank 14 located below the trough 13 on one side thereof. A circulating pump 19, such as a cascade pump, is interposed between the collector tank 14 and coating head 12. A circulating path 17 around the pump 19, collector tank 14 and coating head 12 is formed by a conduit 16. In the circulating path 17, one end of the conduit 16 is connected to the bottom outlet 14a of the collector tank 14 which has a hopper shape as shown, such that no horizontal surfaces are present in the collector tank. The other exposed end of the conduit 16 depends downwardly and extends into a storage container 18 for the coating head 12 through the open top thereof. The portion of the coating solution that has been collected in the collector tank 14 is re-delivered through its bottom outlet 14a and through the circulating pump 15 back into the storage container 18. This re-delivery occurs continually in order to prevent any solids such as metal powders from settling down on the bottom of the collector tank 14. The coating solution is delivered through the entire circulating path 17 back to the storage container 18 under a stirring action.

The coating head 12 includes a support plate 19 having an opening 20 therethrough formed like a slit on which a body 21 forming the storage container 18 is mounted. The body 21 has a square form in cross section, and is open at the top. More specifically, the body 21 has one lateral side 21a (the right-hand side in FIG. 3) extending substantially vertically, and the opposite lateral side 21b (left-hand side in FIG. 3) extending in such a manner that the container 18 becomes narrower gradually from the top to the bottom. The storage container 18 formed in this way has a hopper shape in longitudinal cross section.

On the other exposed end of the conduit 16 that is located within the open top 22 of the storage container 18, there is a coating solution supply section 25 which includes a pipe 24 having slits 23 formed therein. There is also an overflow receptacle 26 formed like a box which is located on one lateral side of the storage container 18. This overflow receptacle 26 accepts any overflow of the coating solution that may occur beyond the upper edge 21c of the lateral side 21b.

Figure 4:
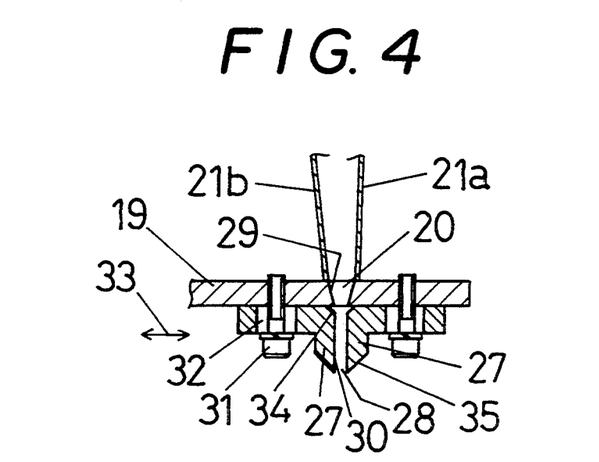
FIG. 4 is a cross-sectional view illustrating, on an enlarged scale, an outlet slit section for a coating head in the preferred embodiment shown in FIG. 1.

Referring to FIG. 4, there are members 27, each having an L-shaped cross section, mounted to the underside of the support plate 19 in such a manner that internal faces 30 thereof face opposite each other. They together form an outlet slit 28 therebetween which communicates with the opening 20 on the support plate 19. To ensure smooth continuity between the internal passage formed by the lateral sides 21a, 21b of the storage container 18 and the outlet slit 28 formed by the internal faces 30 of the L-shaped members 27 through the opening 20, the opening 20 is internally formed so that it becomes narrower toward the outlet slit 28 as shown by 29.

The L-shaped members 27 may be fixed to the support plate 19 by means of bolts 31, respectively. Each of the L-shaped members 27 has a bolt insertion hole 32 that is formed wider longitudinally than the bolt 31 to allow for fine adjustment of the gap formed by the outlet slit 28 by moving the members 27 closer to or away from each other in the direction of the width of the bolt insertion hole 32, as shown by a double arrow 33. To allow for this fine adjustment, the internal face 30 of each of the L-shaped members 27 forming the slit 28 therebetween has its upper corner formed like a chamfer 34 (alternatively, the corner may be formed by radiusing). By providing the chamfered or radiused corner, it is possible to eliminate the part of the L-shaped member 27 that would otherwise partially cover the opening 20 above it when the slit gap is finely-adjusted.

Each of the L-shaped members 27 has its lower end formed into a taper 35, and the internal face 30 of each L-shaped member 27 provides a pointed end. This prevents any droplets from being formed at the outlet when the coating solution goes out of the slit 28.

Figure 6:
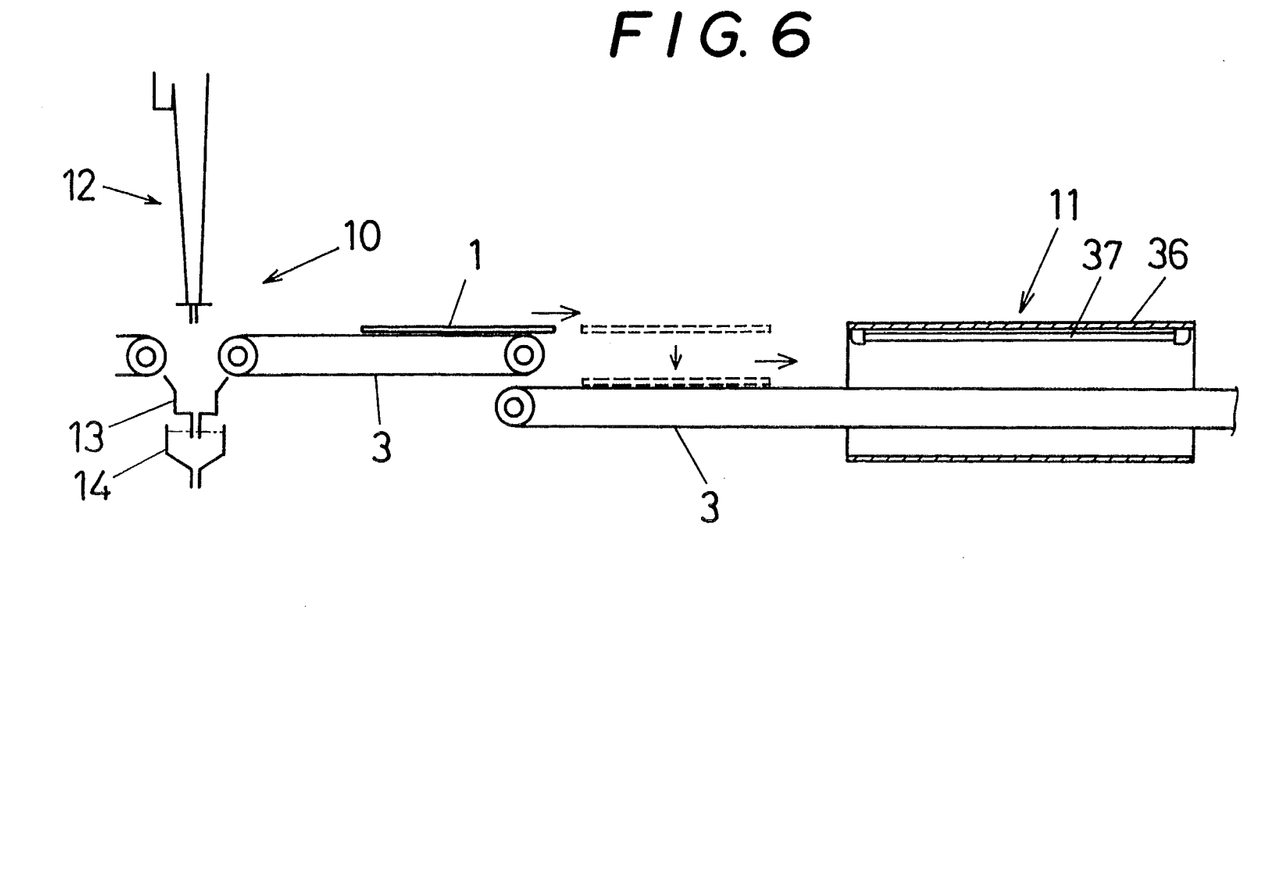
FIG. 6 is a cross-sectional view illustrating a drier section in the preferred embodiment shown in FIG. 1.

Referring next to FIG. 6, the drier section 11 has the form of a box-like furnace 36 which is open on the entry and exit sides and through which the conveyor 3 runs. A heater 37 (such as a medium-wave infrared ray heater) is provided on the inner wall of the furnace 36.

Figure 7:
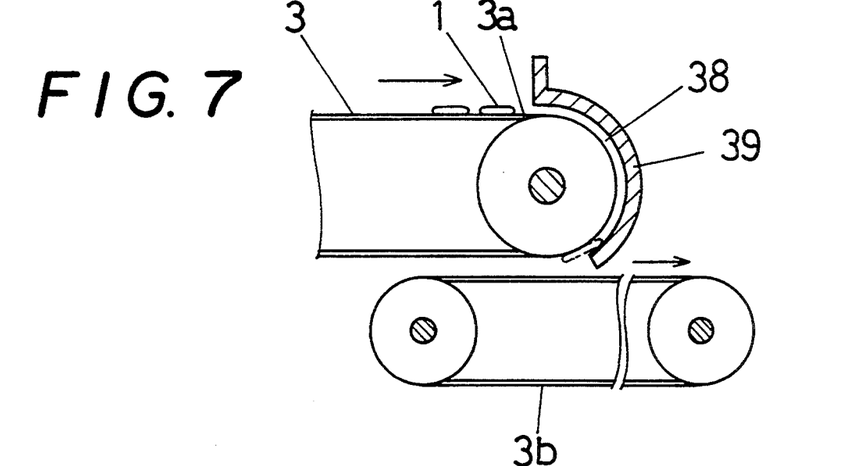
FIG. 7 is a cross-sectional view illustrating a reverser section in the preferred embodiment shown in FIG. 1.

FIG. 7 shows the reverser section 5, in which the upstream side conveyor 3 wraps around at its end 3a below which the downstream side conveyor 3 starts to travel at its beginning end 3b. A semi-circular reversing guide 39 is mounted around the end 3a of the upstream conveyor 3, and is spaced away from the upstream conveyor by a distance (or gap) 38 which is slightly greater than the height of the object 1 being processed.

Figure 8:
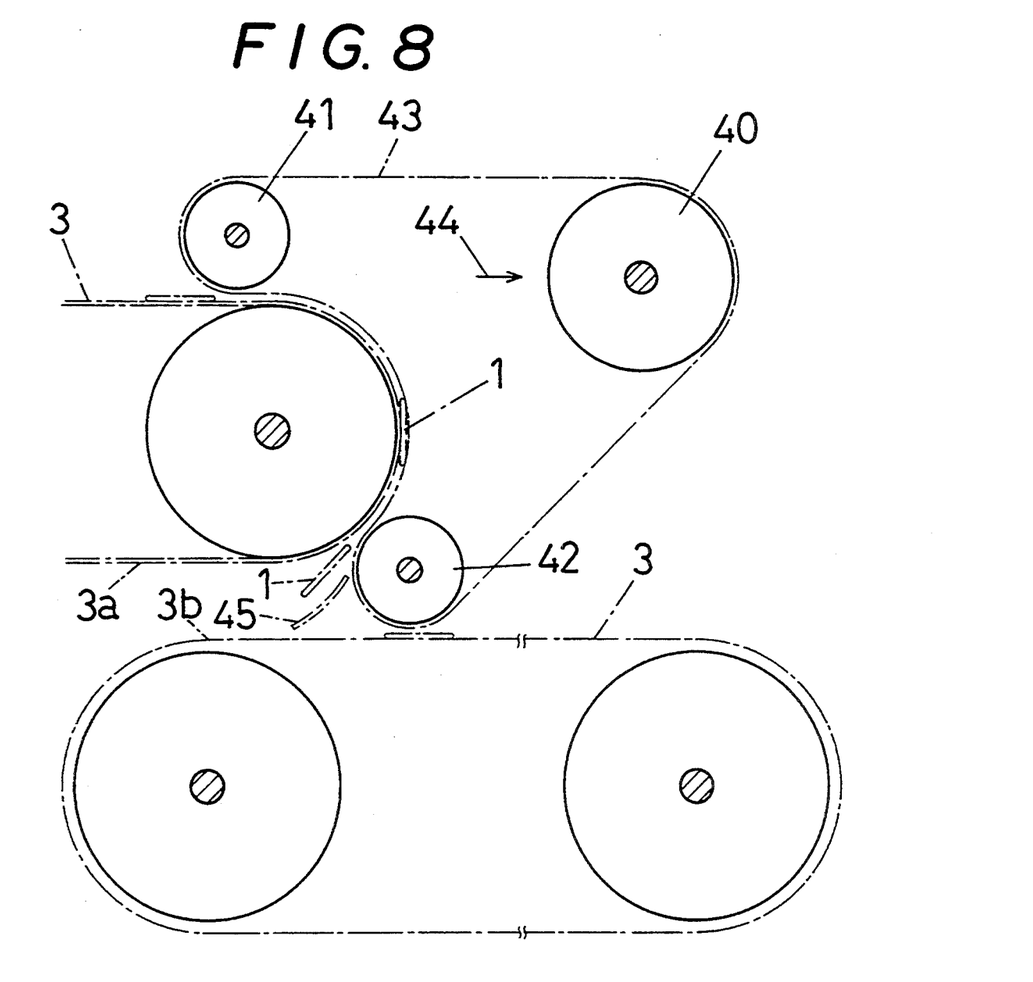
FIG. 8 is a cross-sectional view illustrating a variation of the reverser section of FIG. 7

A variation of the reverser section 5 is shown in FIG. 8. The semi-circular reversing guide 39 may be replaced by a set of pulleys 40, 41, 42 around which a guide belt 43, such as an endless rubber belt, is threaded. The pulleys 40, 41, 42 are arranged such that the guide belt 43 runs in parallel with the upstream conveyor 3, from the end 3a toward the downstream conveyor 3b. The pulley 40 is biased by a spring in the direction of arrow 44, forcing the guide belt 43 to press the object 1 against the end 3a of the upstream conveyor 3. The pressure should be applied gently enough so that the object 1 will not be damaged. As shown, a chute 45 may be provided at the outlet of the pulley 42, and should have the same width as the downstream conveyor 3.

In accordance with the preferred embodiment described above, at the inlet station 6 (FIG. 1), a predetermined number (lot) of objects 1 to be processed, which are extruded metal tubes in this case, are transferred together onto the conveyor passage 2, traveling on the conveyor 3 in the direction of an arrow 46, passing through the curtain coater 10 and then through the drier furnace 11 on the upstream side of the reverser section 5. At the reverser section 5, each individual object 1 is turned over, and goes through the curtain coater 10 and then through the drier furnace 11 on the downstream side of the reverser section 5.

Passing through the curtain coater 10 on the upstream side, the objects cross the curtain stream of the coating solution (brazing alloy powder solution) 47 formed by the coating head 12. After the objects have passed through the curtain coater 10, they will have had a coating of the coating solution deposited on the respective upper sides thereof. Following the curtain coater 10, those objects then enter the drier furnace 11. Passing through the drier furnace 11, the coating on each of the objects is dried. Each succeeding lot of objects 1 goes through the coating process as described above, and as the coating of each preceding lot of objects is finished by the coating head 10, the remainder of the coating solution is collected and recycles. Thus, the coating solution to be applied onto each succeeding lot of objects can contain a uniform mixture of components, and a uniform coating can be applied.

After passing through the drier furnace 11, the coating on each object will have been dried, and the brazing alloy powders contained in the coating will have settled on the object.

At the reverser section 5, each object travels through the gap 38 between the conveyor 3 and reversing guide 39, and is then turned over and transferred onto the downstream conveyor 3 with its reverse side up. On the downstream conveyor 3, each object goes through the curtain coater 10 and then through the drier furnace 11. After passing through the drier furnace 11 on the downstream side, each object will have had the coating completely coated on both sides.

Figure 5A:
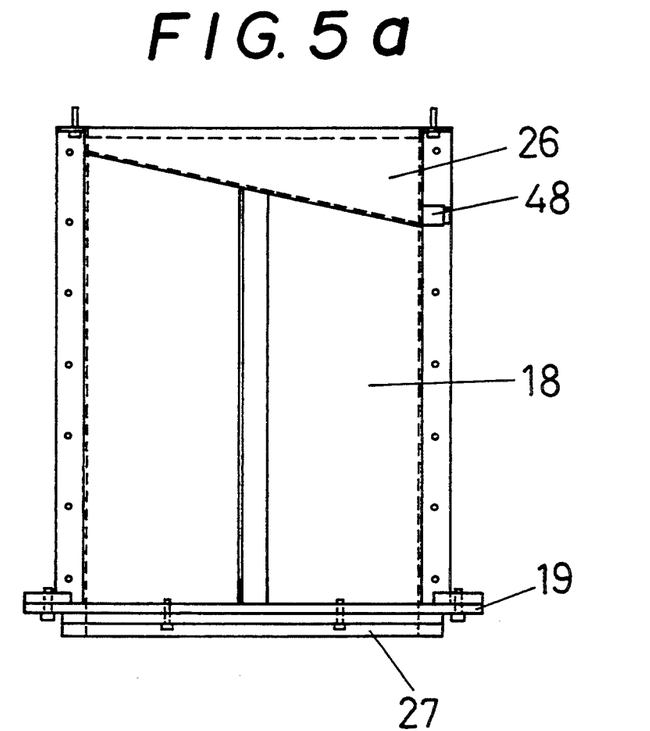
FIG. 5a is a front view illustrating the coating head in the preferred embodiment shown in FIG. 1.
Figure 5B:
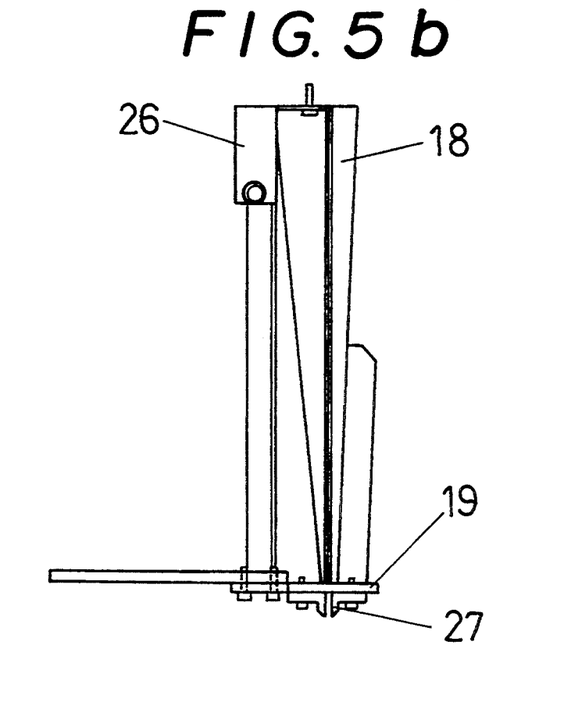

At the coating head 12, the coating solution is supplied through its supply port 25 into the storage container 18. The coating solution is delivered through the outlet slit 28 on the bottom of the storage container 18, flowing in the form of a curtain (i.e. a curtain stream). The supply of the coating solution into the storage container 18 occurs at a higher rate than the delivery of the coating solution through the outlet slit 28, so that the coating solution in the storage container 18 may be maintained at the level in flush with the overflow edge 21c of the lateral member 21b of the cylindrical body 21. Thus, the pressure at which the coating solution is applied through the outlet slit 28 can be maintained constant with high precision, and the rate at which the coating solution is delivered through the outlet slit 28 can be maintained constant accordingly. Any overflow of the coating solution that occurs over the overflow edge 21c of the lateral member 21b will be accepted by the overflow receptacle 26, and will exit through the outlet port 48 (shown in FIG. 5) and back into the storage container 18.

The coating solution contains some brazing alloy powders that have a greater specific gravity and might settle down on the bottom of the storage container 18 if there is no provision to avoid this. According to the present invention, however, there is no part in the storage container 18 where those metal powders remain. Thus, those metal powders can flow in a continuous manner, and are delivered through the outlet slit 28.

Therefore, the Coating solution can maintain the desired uniform ratio of components.

As a result, a uniform coating can be applied for every succeeding lot of objects 1 that travels on the conveyor 3 across the curtain formed by the coating head 12.

When the coating solution is delivered through the outlet slit 28, it is placed under the pressure created inside the storage container 18. This prevents the outlet slit 18 from being clogged with the brazing alloy powders. Thus, no breaks occur in the curtain stream formed by the coating soluting 47 being delivered.

There may be some situations where the outlet slit 28 becomes clogged with the brazing alloy powders. To avoid such situations, the outlet slit 28 is relatively deeper, so that those brazing alloy powders that have clogged the outlet slit 28 may be turned around by the surrounding coating solution. This avoids any breaks in the curtain stream formed by the coating solution 47, and those brazing alloy powders can be delivered under the pressure from the storage container 18.

The gap and depth (the length in the direction of flow through the outlet slit) of the outlet slit 28 may be determined by considering the particle size of the brazing alloy powders that are to be contained in the coating solution. Preferably, the gap should be 0.3 to 0.5 mm for a particle size of about 50 $\mu$m. In this case, the depth should be at least double the slit gap.

Several examples of the preferred embodiment described above are described to demonstrate the performance provided by the coating head 12.

EXAMPLE 1

100 parts of Al-10Si powders (brazing alloy powders) having an average particle size of 40 $\mu$m are prepared, to which 10 parts of acrylic group binder are added. To this are added 55 parts of isopropyl alcohol as a solvent. The resulting mixture is the coating solution that has the viscosity of 30 cp (centimeter poise). In this example, the coating head 12 has a slit gap of 0.3 mm, and the overflow edge 21c is located 200 mm high. Every lot of objects 1 being processed (extruded metal tubes), which totals 1000 objects, is carried on the conveyor 3 at the rate of 100 m/min. Each object has a width of 20 mm and a length of 600 mm. Then, the coating solution obtained as above is applied onto the objects in each lot successively so that the individual objects can have a uniform target coating of 40 $\mu$m.

EXAMPLE 2

The coating solution contains Al-10Si powders having an average particle size of 70 $\mu$m, and the overflow edge 21c is 400 mm high. The other conditions are the same as in EXAMPLE 1, under which a target coating of 70 $\mu$m is applied.

The following table 1 summaries the results for each example, from which it may be seen that the respective target coating has been attained.

TABLE 1

| | Target coating thickness ($\mu$m) | | |
|---|---|---|---|
| | First object | 500th object | 1000th object |
| EXAMPLE 1 | 40 | 41 | 39 |
| EXAMPLE 2 | 70 | 68 | 72 |

It is known that there are two types of coating heads, a closed-type coating head and an open-type coating head. For the closed-type coating head, a coating solution is supplied by a pump into a closed container, from which it is delivered through a slit on the bottom, falling down like a curtain stream. For the open-type coating head, a container open at the top includes a curtain stream forming plate extending downwardly from one lateral side. The container contains a coating solution supplied from its source, from which an overflow of the coating solution travels down along the curtain stream forming plate, and flows like a curtain stream.

To demonstrate their respective usefulness and effectiveness, the closed-type coating head and the open-type coating head were used with the coating solution prepared in EXAMPLE 1. For the closed-type coating head, it was observed that the flow was broken eight times, and the falling curtain stream contained several thin stripes. For the open-type coating head, it was found that the brazing alloy powders contained in the coating solution settled down, and the solvent in the falling curtain stream was increasing as the coating process progressed, particularly during the latter half of the process.

The following description demonstrates the results obtained from the apparatus of the invention that ran continuously for one hour for applying a coating of the coating solution of the invention upon 10,000 objects (which are the extruded metal tubes) traveling successively on the conveyor path. Each object has a width of 20 mm and a length of 600 mm.

The results have been obtained under the following conditions:
Coating solution: the coating solution in EXAMPLE 1 was used;
Coating head: the slit gap was set to 0.3 mm with the slit width to 1200 mm;
Conveyor speed: 100 m/min;
Rate of feed: fifteen (15) objects at a time were placed on the conveyor path at the inlet section 6;
Drier furnace temperature: 150° C.
The results are presented in Table 2.

TABLE 2

| State of Coating | Coating thickness (μm) | | | Bonding rate (%) |
|---|---|---|---|---|
| | 1st object | 5000th | 10000th | |
| good (not detached) | 40 | 39 | 39 | 97 |

It may be seen from the table 2 that when the coating solution is applied successively to all the objects, each of the objects has a uniform coating thickness formed thereon, and there is no exfoliation of the coating from it.

Figures 9, 10:
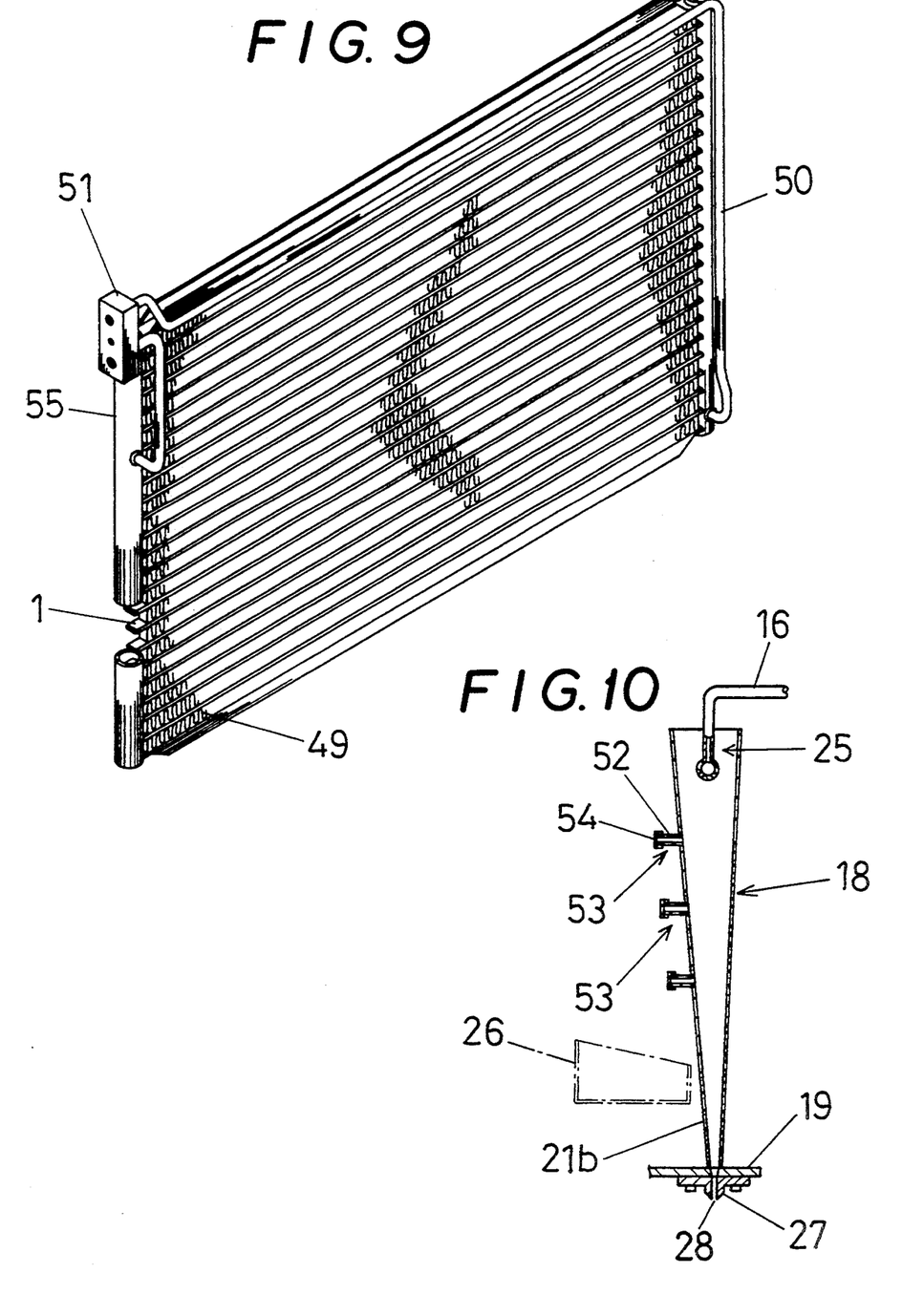
FIG. 9 is a perspective view illustrating part of an assembled heat exchanger including an extruded metal tube finished by using the preferred embodiment of the present invention, the part being shown broken away.
FIG. 10 is a cross-sectional view illustrating a variation of the coating head according to another preferred embodiment of the present invention.

The figure shown in the column "Bonding rate (%)" is calculated from the results obtained by applying the coating solution of the invention to the joints between the different components in the heat exchanger shown in FIG. 9 which have been assembled, including an aluminum alloy-made corrugated fin 49, a connecting pipe 50, a joint 51, and a header pipe 55. After forming the coating layer or film of the brazing alloy powder solution of EXAMPLE 1 on the surface of the extruded metal tube 1, the components have been assembled, and then a fluoride flux is added into the joints between those components. Then, the brazing process occurs for five (5) minutes during which the components are heated to 600° C. in an inert gas atmosphere. As seen from Table 2, the brazing process provides a high bonding rate.

The preferred embodiment that has been described so far may be modified. In the apparatus, the combination of the conveyors 3 in the conveying arrangement 2 is not restricted to the described embodiment. For example, in the embodiment shown and described above, the objects 1 travel on the conveyors 3 with their respective longitudinal edges parallel with the direction of travel. The objects 1 may travel on the conveyors 3 with their respective longitudinal edges across the width of the conveyor 3. In this way, the curtain stream formed by the coating solution from the curtain coater 10 can have a width smaller than the length of the object 1. Thus, the objects 1 can travel across the curtain stream, with the opposite ends of each of the objects remaining not coated.

Similarly, the objects may travel through the drier furnace, with their longitudinal edges either parallel with the conveyor path or across it.

The curtain coater 10 and drier furnace 11 on the downstream side of the reverser section 5 may be omitted. The curtain coater and drier furnace on the upstream side of the reverser section 5 may be used instead of those on the downstream side. In this case, the object that has one side thereof finished is returned to the inlet section 6, from which it is placed on the conveyor 3 with the other side up, and again passes through the curtain coater and drier section on the upstream side of the reverser section 5.

In the coating head 12, the coating solution within the storage container 18 may be maintained at a constant level by the overflow edge 21c of the lateral side member 21b, thereby maintaining the pressure upon the outlet slit 28 constant. In a variation as shown in FIG. 10, the coating solution within the storage container may be maintained at different levels, depending upon the particular needs, to thereby adjust the pressure upon the outlet slit 28 accordingly.

In the variation shown in FIG. 10, the one lateral side member 21b of the storage container 18 has outlet ports 53 at different levels, each of which is provided by a short pipe 52 to which a plug 54 is removably mounted. An overflow receptacle 26 is provided outside the lateral side member 21b, for accepting any overflow from any of the outlet ports 53.

According to the variation shown in FIG. 10, the plugs 54 may be selectively mounted to or removed from the appropriate outlet ports, depending upon the particular needs such as the nature of the coating solution being used. The coating solution may thus be maintained at the desired constant level, thereby maintaining the pressure upon the outlet slit 28 at the appropriate level.

In all of the embodiments and variations thereof, the storage container 18 may be lined with fluororesin which prevents any residue of a coating solution from staying therein.

The method and apparatus according to the present invention provide advantages in that a uniform coating of the coating solution can be applied in a successive manner.

The coating head of the invention provides advantages in that a successive coating of the coating solution can be applied without being clogged with any brazing alloy powders contained in the coating solution.

Although the present invention has been described with reference to the particular preferred embodiments and possible variations thereof, it should be understood that various changes and modifications may be made without departing from the spirit and scope of the invention.

What is claimed is:

1. A coating head for applying a coating solution onto objects, said coating head comprising:
   a storage container having an open top end;
   level setting means, provided at one lateral side of said storage container, for setting a level of the coating solution within said storage container;
   delivery means, comprising an outlet slit in communication with a bottom of said storage container, for delivering the coating solution in a curtain-like stream; and
   an intermediate communication section mounted between said storage container and said outlet slit of said delivery means, said intermediate communication section having an internally tapered opening extending therethrough.

2. A coating head as recited in claim 1, wherein said delivery means comprises a pair of elongated members mounted to a bottom of said storage container, each of said elongated members being L-shaped in cross section so as to include a horizontal portion and a vertical portion depending from said horizontal portion, said vertical portions facing one another across a gap, said gap constituting said outlet slit.

3. A coating head as recited in claim 2, wherein said elongated members are horizontally movably mounted to the bottom of said storage container for movement toward and away from one another to adjust a width of said outlet slit.

4. A coating head as recited in claim 2, wherein said vertical portions of said elongated members have respectively confronting surfaces, and upper corners of said elongated members at said confronting surfaces thereof are respectively chamfered such that an upper end of said outlet slit is flared outwardly and upwardly.

5. A coating head as recited in claim 1, wherein said delivery means comprises a pair of elongated members mounted to a bottom of said intermediate communication section, each of said elongated members being L-shaped in cross section so as to include a horizontal portion and a vertical portion depending from said horizontal portion, said vertical portions facing one another across a gap, said gap constituting said outlet slit.

6. A coating head as recited in claim 5, wherein said elongated members are horizontally movably mounted to the bottom of said intermediate communication section for movement toward and away from one another to adjust a width of said outlet slit.

7. A coating head as recited in claim 5, wherein said vertical portions of said elongated members have respectively confronting surfaces, and upper corners of said elongated members at said confronting surfaces thereof are respectively chamfered such that an upper end of said outlet slit is flared outwardly and upwardly.

8. A coating head as recited in claim 1, wherein said storage container has a pair of opposing lateral sides which converge downwardly toward one another, each of said lateral sides having a bottom edge adjacent said outlet slit and a top edge and being substantially straight and planar from said top edge to said bottom edge.

9. A coating head as recited in claim 8, wherein each of said opposing lateral sides is substantially continuous and uninterrupted from said top edge to said bottom edge.

10. A coating head as recited in claim 1, further comprising
    a collecting tank mounted below said outlet slit, said collecting tank having a downwardly opening outlet formed at a bottom-most portion thereof; and
    a conduit connected to said downwardly opening outlet and extending upwardly such that a terminal end thereof is disposed in said open top end of said storage container.

11. A coating head as recited in claim 10, wherein said collector tank has a downwardly converging outlet portion opening into said downwardly opening outlet, such that said collecting tank is free of internal horizontal surfaces.

12. A coating head for applying a coating solution onto objects, said coating head comprising:
    a storage container having an open top end;
    level setting means, provided at one lateral side of said storage container, for setting a level of the coating solution within said storage container;
    delivery means, comprising an outlet slit in communication with a bottom of said storage container, for delivering the coating solution in a curtain-like stream; and
    wherein said delivery means comprises a pair of elongated members mounted to a bottom of said storage container, each of said elongated members being L-shaped in cross section so as to include a horizontal portion and a vertical portion depending from said horizontal portion, said vertical portions facing one another across a gap, said gap constituting said outlet slit.

13. A coating head as recited in claim 12, wherein said elongated members are horizontally movably mounted to the bottom of said storage container for movement toward and away from one another to adjust a width of said outlet slit.

14. A coating head as recited in claim 12, wherein said vertical portions of said elongated members have respectively confronting surfaces, and upper corners of said elongated members at said confronting surfaces thereof are respectively chamfered such that an upper end of said outlet slit is flared outwardly and upwardly.

15. A coating head as recited in claim 12, wherein said storage container has a pair of opposing lateral sides which converge downwardly toward one another, each of said lateral sides having a bottom edge adjacent said outlet slit and a top edge and being substantially straight and planar from said top edge to said bottom edge.

16. A coating head as recited in claim 15, wherein each of said opposing lateral sides is substantially continuous and uninterrupted from said top edge to said bottom edge.

17. A coating head as recited in claim 12, further comprising
    a collecting tank mounted below said outlet slit, said collecting tank having a downwardly opening outlet formed at a bottom-most portion thereof; and
    a conduit connected to said downwardly opening outlet and extending upwardly such that a terminal end thereof is disposed in said open top end of said storage container.

18. A coating head as recited in claim 17, wherein said collector tank has a downwardly converging outlet portion opening into said downwardly opening outlet, such that said collecting tank is free of internal horizontal surfaces.

19. A coating head for applying a coating solution onto objects, said coating head comprising:
   a storage container having an open top end;
   level setting means, provided at one lateral side of said storage container, for setting a level of the coating solution within said storage container;
   delivery means, comprising an outlet slit in communication with a bottom of said storage container, for delivering the coating solution in a curtain-like stream;
   wherein said storage container has a pair of opposing lateral sides which converge downwardly toward one another, each of said lateral sides having a bottom edge adjacent said outlet slit and a top edge and being substantially straight and planar from said top edge to said bottom edge; and
   wherein each of said opposing lateral sides is substantially continuous and uninterrupted from said top edge to said bottom edge.

20. A coating head for applying a coating solution onto objects, said coating head comprising:
   a storage container having an open top end;
   level setting means, provided at one lateral side of said storage container, for setting a level of the coating solution within said storage container;
   delivery means, comprising an outlet slit in communication with a bottom of said storage container, for delivering the coating solution in a curtain-like stream;
   a collecting tank mounted below said outlet slit, said collecting tank having a downwardly opening outlet formed at a bottom-most portion thereof;
   a conduit connected to said downwardly opening outlet and extending upwardly such that a terminal end thereof is disposed in said open top end of said storage container; and
   wherein said collector tank has a downwardly converging outlet portion opening into said downwardly opening outlet, such that said collecting tank is free of internal horizontal surfaces.

* * * * *